April 3, 1951 S. R. BATTOCCHI 2,547,553
SAW GRINDING MECHANISM
Filed April 1, 1949 2 Sheets-Sheet 1

Inventor
SILVIO R. BATTOCCHI
By
Lindsey, Prutzman & Just
Attorneys

April 3, 1951  S. R. BATTOCCHI  2,547,553
SAW GRINDING MECHANISM
Filed April 1, 1949  2 Sheets-Sheet 2
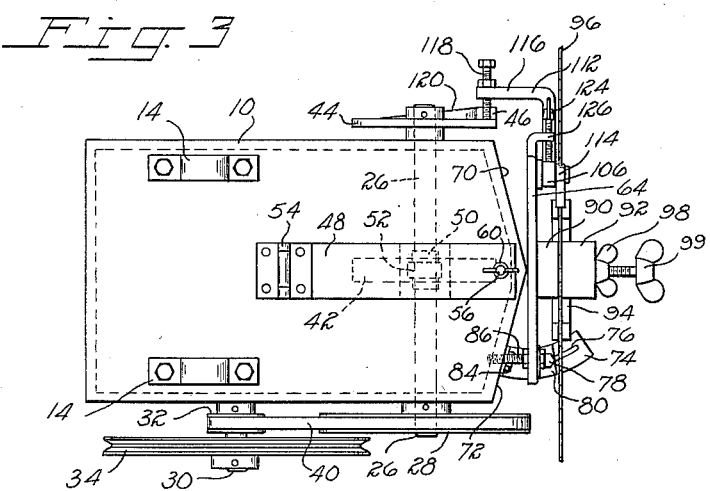
Fig. 3
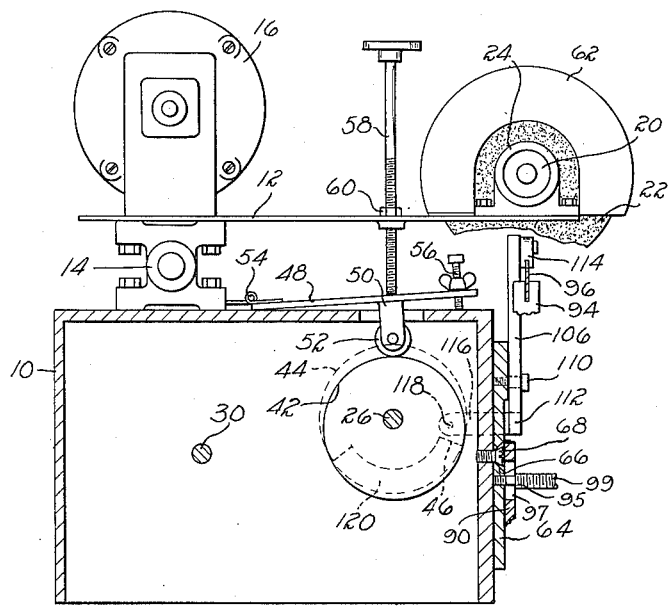
Fig. 4
Fig. 5
Inventor
SILVIO R. BATTOCCHI
By
Lindsey Prutzman & Just
Attorneys Patented Apr. 3, 1951

2,547,553

UNITED STATES PATENT OFFICE 2,547,553

SAW GRINDING MECHANISM

Silvio R. Battocchi, Hartford, Conn.

Application April 1, 1949, Serial No. 84,927

4 Claims. (Cl. 76—40)

This invention relates to a saw grinding mechanism and, more particularly, to a saw grinding mechanism for grinding the teeth of saws having blades of substantially uniform width such as those used on a band saw, meat saws used by butchers, and the like.

Saw grinding machines which are automatically operated have been devised heretofore but they have included elaborate and complex means for adjusting the saw blade holding means as well as feeding the blade relative to the grinding wheel.

It is the principal object of the present invention to provide a compact and simplified mechanism including blade guiding means which are adjustable about two different axes to permit the grinding of different shapes of saw teeth as well as angles of the faces thereon, and also including in the saw grinder adjustable means for automatically feeding the saw relative to the grinding wheel, such adjustment permitting various lengths of the saw being fed at a single time in order to grind different shapes of teeth as well as different lengths of spaces between adjacent teeth.

It is another object of the invention to provide simplified means for driving the grinding wheel and the saw feeding means as well as providing adjustment in said feeding means which, in conjunction with other features of the invention, contributes to the production of different shapes of teeth on a saw as well as different spacings between adjacent teeth.

Details of these objects and of the invention as well as other objects thereof are set forth in the following specification and illustrated in the attached drawings comprising a part thereof.

In the drawings:

Fig. 3 is a top plan view of the lower portion of the saw grinding machine shown in Fig. 1, the grinding head of said machine being omitted in the mechanism shown in Fig. 3.

Fig. 4 is a vertical sectional view of the machine, the section being taken on a vertical median plane through the mechanism.

Fig. 5 is a fragmentary section of a saw blade having teeth shaped and spaced in a manner capable of being formed by the mechanism shown in the other figures.

Figure 1:
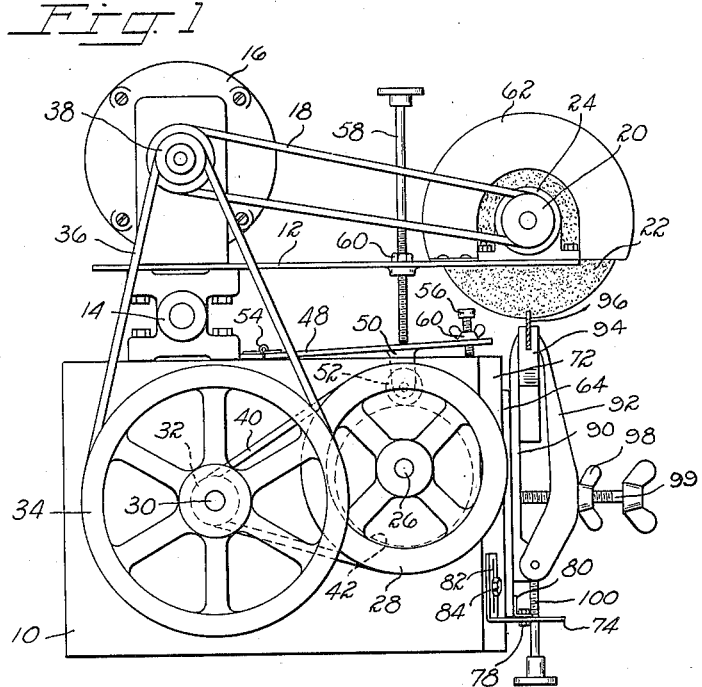
Fig. 1 is a side elevation of a saw grinding mechanism embodying the principles of the present invention.

Referring to the drawings, the saw grinding mechanism comprising the present invention comprises a casing or support 10 which encloses part of the mechanism which moves certain elements of the invention to be described hereinafter. Said support also provides a base to which all of the other elements of the grinding mechanism are secured to form a compact unitary structure. Pivotally secured to the top surface of said support 10 is a member 12 which in the present embodiment is shown in the nature of a plate connected by suitable spaced bearings 14 to said support. The member 12 supports a conventional electric motor 16 which is connected by a belt 18 to the pulley 20 of a grinding wheel 22 which is supported in suitable bearings 24 at the forward end of the member 12. The grinding wheel is of any suitable diameter, thickness, and shape at its edge or periphery to adapt it to grind any desired shape of tooth within a wide range of shapes and sizes.

Extending transversely through one part of the support 10 is a horizontal timing shaft 26 to one end of which a pulley 28 is secured. Another shaft 30 extends through the support 10 so as to be parallel to the shaft 26 and spaced backward therefrom relative to the front of the support 10. A small pulley 32 and a large pulley 34 are disposed adjacent each other on one end of shaft 30, the large pulley being connected by belt 36 to a pulley 38 on the motor 16. Small pulley 32 is connected by belt 40 to pulley 28 on shaft 26. Thus, the speed of rotation of shaft 26 is materially less than that of the motor shaft due to the reduction in speed effected by the various pulleys and belts just described.

Connected to the shaft 26 and disposed within the support 10 is a peripheral type cam or eccentric 42 which is rotatable with said shaft. Mounted on the end of shaft 26 opposite the supporting pulley 28, and disposed outward of but adjacent one side of the support 10 is a face type cam 44 having a drop-off 46, said cam being fixed to shaft 26 for rotation thereby. Preferably, while cam 44 is fixed to said shaft 26, it may be adjusted on said shaft relative to the position of cam 42 for purposes to be described.

Also pivotally connected at one end to the support 10 is a cam follower plate 48 having a depending member 50 which rotatably supports a cam engaging roller 52 that rides upon the periphery of cam 42. A hinge 54 serves to connect the plate 48 to the support 10. Mounted on the free end of plate 48 is an adjustable stop member 56 which is threaded through said plate and has a suitable lock nut 60 thereon to maintain the stop member 56 in any desired position of adjustment relative to said plate 48. The lower end of the stop member 56 engages the top of support 10 or any other suitable fixed surface so as to vary the vertical movement of the plate 48 relative to the support 10. With this arrangement, it is possible to elevate the free end of the plate 48 so that the roller 52 is out of contact with the periphery of cam 42 during part of the rotative movement thereof.

Member 12 is also provided with an adjustable threaded rod 58 which may be manually rotated to vary the distance between member 12 and plate 48, the lower end of rod 58 engaging the upper surface of plate 48 directly above the roller 52. Vertical movement of the plate 48 is thus imparted to member 12 and the grinding wheel 22 by means of the rod 58. Said rod may be locked relative to member 12 by a nut 60. It will also be noted that the major portion of the grinding wheel 22 is preferably covered by a suitable guard 62 which is fixed to the member 12. It will thus be seen that as the cam 42 is continually rotated by the motor 16, the grinding wheel will be raised and lowered at regular intervals relative to the upper surface of the support 10.

Saw supporting and guiding means are also provided on the support 10, the same comprising a plate 64 which extends substantially vertically in normal position, said plate being provided centrally thereof with an aperture 66 which receives the head of a bolt 68 threaded into the front face of the support 10. The head of bolt 68 is countersunk into the plate 64 as shown in Fig. 4. Said front face, in plan view, is composed of a pair of angularly related surfaces 70 and 72 said surfaces being substantially vertical however. Clearance between the head of bolt 68 and aperture 66 will permit the plate 64 to pivot about a vertical axis substantially comprising the meeting line of the angularly related surfaces 70 and 72.

Such angular adjustment of the plate 64 is maintained by a bracket 74 having an arcuate slot 76 through which extends a bolt 78 fixed to the lower edge of plate 64 by a bracket 80. The bracket 74 is also provided with a vertical leg having a slot 82 which receives a locking bolt 84 that extends through the surface 72 of the support 10. The bracket 74 is thus adjustable vertically relative to the surface 72 and the plate 64 may be clamped in any desired position relative to its vertical axis by clamping bolt 78.

The plate 64 is also adjustable a limited amount about the axis of the bolt 68. Any desired adjusted position of the plate 64 relative to said horizontal axis is maintained by a locking bolt 86 which passes through an arcuate slot 88 in the plate 64.

The plate 64 also supports a pair of clamping members 90 and 92. A saw supporting and guiding yoke 94 is supported by clamping member 90, said yoke having suitable slots to guide a saw blade 96. The clamping member 92 is adjustable relative to the clamping member 90 by means of a wing nut 98 on a bolt 99 which passes through a slot 97 in clamping member 90 and threads into a hole in plate 64 as shown in Fig. 4. A shoulder 95 on bolt 99 engages member 90 to hold it clamped in adjusted position. Vertical adjustment of the clamping members and yoke is accomplished by adjusting threaded rod 100 mounted in a bearing 102 on plate 64 to regulate the position of the saw relative to the grinding wheel 22. Preferably, the upper ends of the clamping members 90 and 92 are moved into engagement with the blade 96 so as not to tightly clamp the blade but merely slidably engage it to accurately guide the blade in the slots in the yoke 94. The grinding wheel 22 is also preferably thin so that it requires no dressing during use.

The illustrative saw 96 is moved longitudinally of itself within the guide yoke 94 by means comprising an L-shaped lever 106 provided with a plurality of bearing apertures 108 arranged to receive a bolt 110 by which the lever 106 is pivotally supported. The plate 64 is also provided with a series of threaded apertures corresponding to and aligned with the apertures 108 in the lever, whereby the bolt 110 may be inserted through any desired pair of apertures and threaded into plate 64 to support the lever for pivotal movement, the selection of the apertures depending upon the length of lever arm desired at opposite ends of the lever 106. It will be seen that when the bolt 110 is in the lowermost aperture of the lever 106 and plate 64, a small amount of movement of the lower end 112 of the lever 106 will provide a materially greater amount of movement at the upper end of said lever which pivotally supports a blade engaging pawl 114.

The lower end 112 of the L-shaped lever 106 is also L-shaped in plan view as shown in Fig. 3, the end 116 thereof which is parallel to one side of support 10 carrying an adjustable bolt 118 which may be locked in a position relative to the end 116. The inner end of said bolt is engageable with the cam surface 120 of cam 44. Thus, as cam 44 is rotated by shaft 26, the cam surface 120 will engage the inner end of bolt 118 and move the lower end of the lever 106 outward, away from the adjacent side of the support 10, and correspondingly move the pawl 114 to the left as viewed in Fig. 2, advancing the teeth of the saw blade by such action.

The cam 44 moves the upper end of the lever 106 in one direction, the same being the feeding direction of the saw, and a suitable spring 122 moves the lever 106 in the opposite direction to return it to its starting position after the bolt 118 has passed from the drop-off 46 of the cam 44 at the end of the feeding movement of the saw blade.

Figure 2:
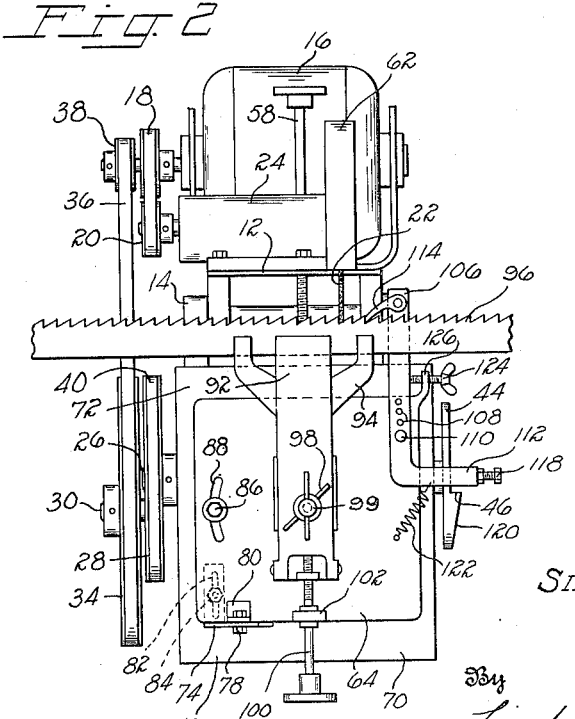
Fig. 2 is a front elevation of the mechanism shown in Fig. 1.

Not only is the amount of movement of the lever 106 controlled by the particular aperture within which the bolt 110 is mounted, but said amount of movement is also controlled by the adjustment of the bolt 118 in the end 116 of the lever 106, as well as an adjustable stop comprising a wing bolt 124 carried by a suitable projection 126 provided on the upper right hand corner of plate 64 as viewed on Fig. 2. Thus, the bolt 124 may be so adjusted that, when the spring 122 moves the lever 106 in a reverse direction to that which the cam 44 moves it, the bolt 124 can be adjusted to stop the return or counter feeding movement of the pawl 114 before the end of the bolt 118 in the lower end of the lever engages the flat surface of the cam 44.

As mentioned above, the angular position of the cam 44 may also be varied relative to the cam 42 and, while in many circumstances it will be desired to so adjust the relative positions of cams 42 and 44 so that feeding movement of the saw will take place only when the grinding wheel 22 is elevated, it is also possible to adjust the cam 44 relative to cam 42 so that the saw will be advanced in feeding direction while the grinding wheel is in engagement with the saw blade. By this means, spaces 128 may be provided between teeth 130 on the saw blade 96 as shown in Fig. 5, the surfaces 128 being parallel to the back edge of the plate 96.

In view of the various adjustments provided between the cams 42 and 44, the adjustability of the plate 64 and the saw support carried thereby about both horizontal and vertical axes, and the adjustability in the feeding movement of the pawl 114 due to the various features of adjustment in the mounting of the lever 106 and the cam engaging and stop means therefore, it is possible to grind teeth on a saw blade having a wide variety of shapes, spacings, sizes, as well as different angular faces on the ground surfaces of the teeth relative to the plane of the saw blade. All of this is possible while using this very simple machine comprising relatively few parts arranged as described above.

Further, a single motor actuates a plurality of driving mechanisms which actuate the various movable members so as to revolve the grinding wheel as well as move grinding wheel vertically relative to a saw blade, and also periodically move the saw blade in feeding direction so that similarly shaped and evenly spaced teeth are ground thereon by the grinding wheel. The device is also very compact as compared to saw grinding machines now available, and all settings and adjustments of the various adjustable bolts, locking nuts, and the like of the machine or mechanism are within convenient reach and are easily manipulated to effect any desired adjustment of all of the various adjustable members.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim:

1. A saw filing machine comprising in combination, a support having a pair of normally vertical and angularly related surfaces thereon meeting along a vertical apex line, a member pivotally connected at one end to the upper portion of said support, a motor and grinding wheel carried by said pivoted member, said grinding wheel being normally operable in a vertical plane and driven by said motor, a saw guide plate adjustably mounted relative to said support against said apex line thereon and having an elongated saw blade guide parallel to said plate, said guide being adjustable about said vertical line and also about a horizontal axis to vary the position of said guide in said plate relative to the plane of said grinding wheel, means to clamp said guide plate in adjusted position against said vertical apex line, feeding means engageable with the teeth of said saw and operable to periodically advance the saw within said blade guide for grinding by said wheel, and wheel elevating means automatically operable in relation to the saw feeding means to raise the free end of the pivoted member which supports the wheel as the feeding means advances the saw within said blade guide relative to said wheel.

2. A saw filing machine comprising in combination, a support having a pair of normally vertical and angularly related surfaces thereon meeting along a vertical apex line, a member pivotally connected at one end to the upper portion of said support, a motor and grinding wheel carried by said pivoted member, said grinding wheel being normally operable in a vertical plane and driven by said motor, a saw guide, a plate having a central aperture, a supporting pintle projecting transversely from said vertical apex line on said support and extending through said aperture of said plate, said plate being positioned against said apex line for movement about said line as a fulcrum and also about the axis of said supporting pintle to vary the position of the saw guide on said plate relative to the plane of said grinding wheel, means operable to clamp said plate in adjusted position against said vertical apex line, feeding means engageable with the teeth of said saw to periodically advance the saw for grinding by said wheel, and grinding wheel elevating means automatically operable in relation to the saw feeding means to raise the free end of the pivoted member which supports the grinding wheel as the feeding means advances the saw within said guide relative to said wheel.

3. A saw filing machine comprising in combination, a support having normally vertical and angularly related surfaces meeting along a vertical apex line, a member pivotally connected at one end to said support, a motor and grinding wheel carried by said pivoted member, said grinding wheel being normally operable in a vertical plane and driven by said motor, saw guide means adjustably mounted relative to said support against said apex line and having an elongated saw blade guide, means to clamp said guide means in adjusted position, feeding means pivotally carried by said saw guide means and engageable with said saw to periodically advance the teeth thereof relative to said guide means for grinding by said wheel, a timing shaft rotatably supported by said support, power transmitting means connecting said motor and said timing shaft, a cam fixed to said shaft, means on said pivoted member engaging said cam and operable thereby to raise and lower said grinding wheel relative to a saw blade as said cam is rotated, and another cam carried by said timing shaft and operable thereby in timed relation to said first cam to sequentially actuate said feeding means to advance said saw within said guide means as said grinding wheel is sequentially raised by said first-mentioned cam relative to said saw.

4. A saw filing machine comprising in combination, a support having a pair of normally vertical and angularly related surfaces meeting along a vertical apex line, a member pivotally connected at one end to the upper portion of said support, a motor and grinding wheel carried by said pivoted member, said grinding wheel being normally operable in a vertical plane and driven by said motor, saw guide means adjustably mounted relative to said support against apex line and having an elongated saw blade guide, said guide means being adjustable about a vertical axis and about a horizontal axis, means to clamp said guide in adjusted position, feeding means comprising a lever pivoted to said saw guide means, a pawl carried by one end thereof and engageable with the teeth of a saw to advance the saw when moved by said lever, a timing shaft rotatably supported by said support, power transmitting means connecting said motor and timing shaft, a face-type cam carried by one end of said timing shaft and engaging the other end of said lever to actuate it in one direction, said other end of said feeding lever having an adjustable cam engaging means operable to vary the extent of engagement between the lever and cam and correspondingly vary the throw of the pawl and of the lever; and a grinding wheel elevating cam carried by said timing shaft and automatically operable in relation to the saw feeding means to raise the free end of the pivoted member which supports the wheel as the feeding means advances the saw.

SILVIO R. BATTOCCHI.

REFERENCES CITED

The following references are of record in the file of this patent:

UNITED STATES PATENTS

| Number | Name | Date |
| --- | --- | --- |
| 1,551,230 | Armstrong | Aug. 25, 1925 |
| 1,781,941 | Armstrong | Nov. 18, 1930 |
| 1,832,878 | Porter | Nov. 24, 1931 |
| 2,175,514 | Buchanan | Oct. 10, 1939 |
| 2,334,136 | Underwood | Nov. 9, 1943 |
| 2,470,290 | Chryst | May 17, 1949 |

FOREIGN PATENTS

| Number | Country | Date |
| --- | --- | --- |
| 341,628 | Great Britain | Jan. 22, 1931 |